June 12, 1962     H. B. TURNER     3,038,197

DISJOINTING MACHINE FOR CARCASS LIMBS

Filed March 19, 1959     4 Sheets-Sheet 1

INVENTOR
H. B. TURNER

BY *Albert J. Kramer*

ATTORNEY

June 12, 1962 H. B. TURNER 3,038,197
DISJOINTING MACHINE FOR CARCASS LIMBS
Filed March 19, 1959 4 Sheets-Sheet 2
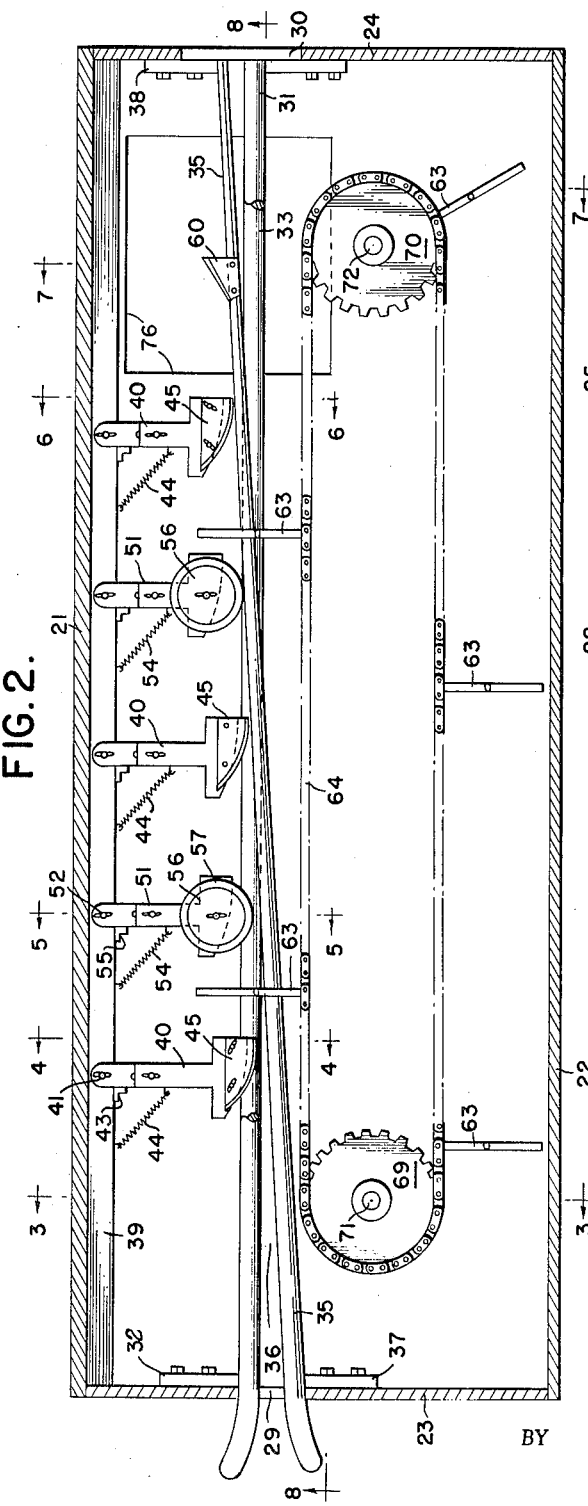
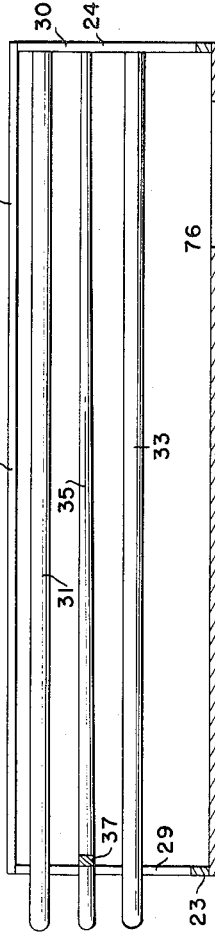
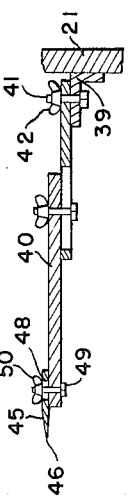
INVENTOR
H. B. TURNER
BY Albert J. Kramer
ATTORNEY June 12, 1962     H. B. TURNER     3,038,197

DISJOINTING MACHINE FOR CARCASS LIMBS

Filed March 19, 1959     4 Sheets-Sheet 3

INVENTOR
H. B. TURNER

BY *Albert J. Kramer*

ATTORNEY

June 12, 1962 H. B. TURNER 3,038,197
DISJOINTING MACHINE FOR CARCASS LIMBS
Filed March 19, 1959 4 Sheets-Sheet 4

INVENTOR
H.B. TURNER

BY Albert J. Kramer
ATTORNEY

United States Patent Office 3,038,197
Patented June 12, 1962

3,038,197
DISJOINTING MACHINE FOR CARCASS LIMBS
Herman B. Turner, Timberville, Va., assignor to King Manufacturing Corporation, Timberville, Va., a corporation of Virginia
Filed Mar. 19, 1959, Ser. No. 800,410
2 Claims. (Cl. 17—11)

This invention relates to the processing of animal carcasses and it is more particularly concerned with the disjointing or separation of joints, especially the limb joints of fowl.

In the process of preparing edible animal carcasses, the separation of various joints is often effected. In poultry, for example, the leg joints are severed in order to remove the leg section from the thigh section. In effecting this severance, it is important to avoid rupturing the bone structure of the thigh section adjacent the joint, not only for appearance sake, but also to preserve the keeping qualities of the carcass.

The general object of this invention is the provision of a machine for separating carcass joints, particularly the limb joints of poultry, although the limbs of other animals, such as hogs, sheep, and cattle may be similarly treated.

Another object is to provide a machine which will effect the separation of the joint without rupturing adjacent bone structure.

A further object is the provision of a disjointer which is automatic in its operation, and which can be applied to a continuously moving line of carcasses suspended from an overhead carrier.

A still further object of the invention is the provision of a disjointer of the type mentioned which is positive in its action, easy to operate, and which is capable of prolonged use without the likelihood of getting out of order.

These and still further objects, advantages and features of the invention, will appear more fully from the following description considered together with the accompanying drawing.

Figure 1:
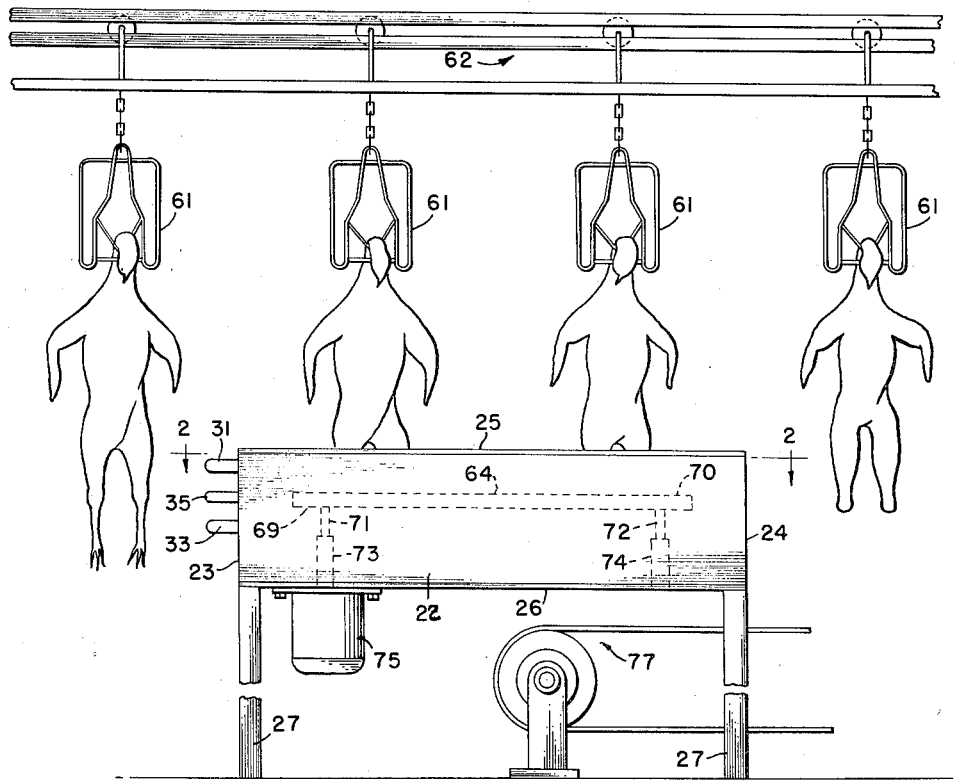
Figure 6:
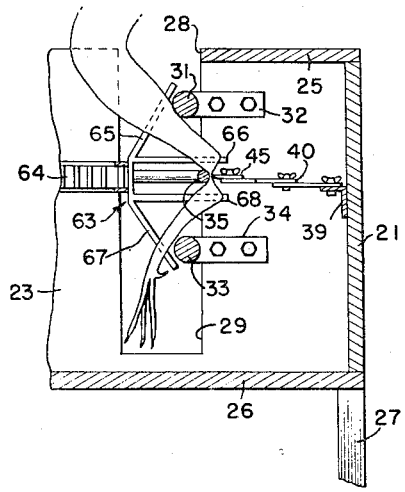
Figure 9:
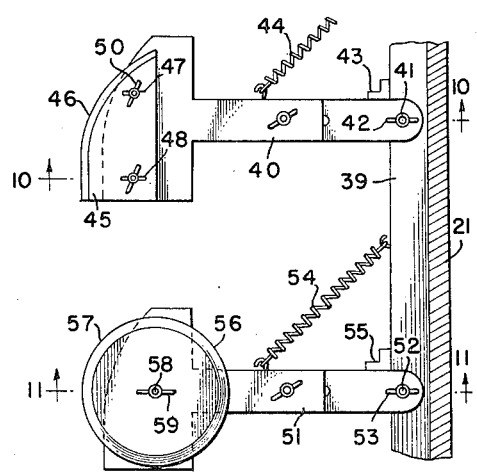
Figure 3:
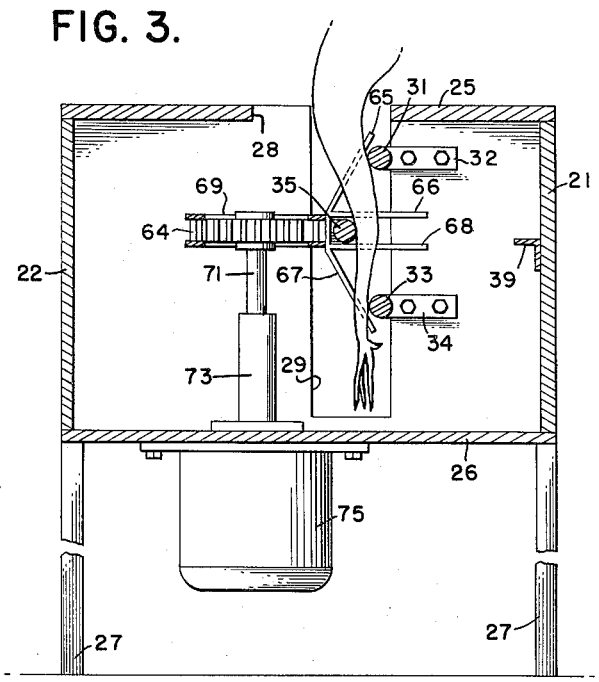
Figure 4:
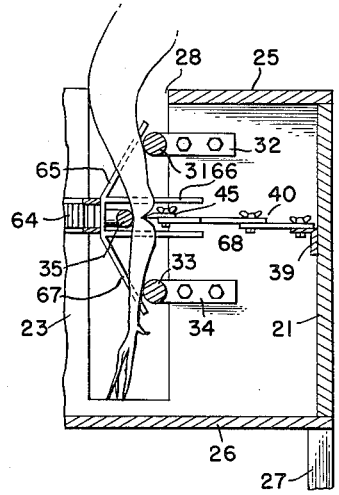
Figure 7:
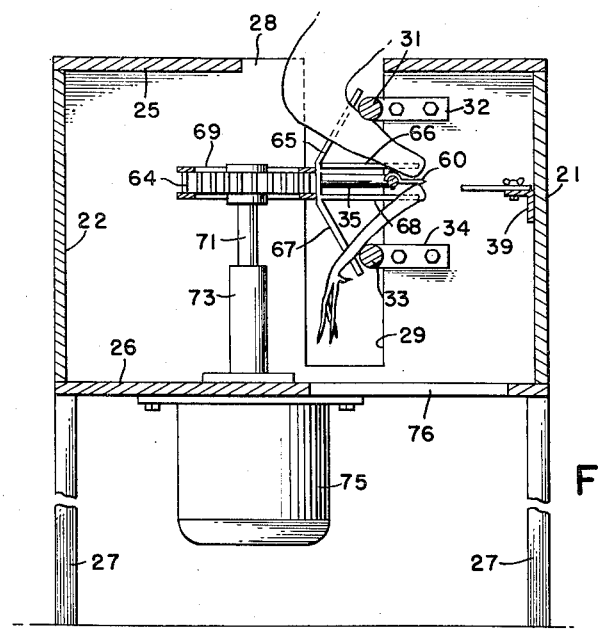
Figure 5:
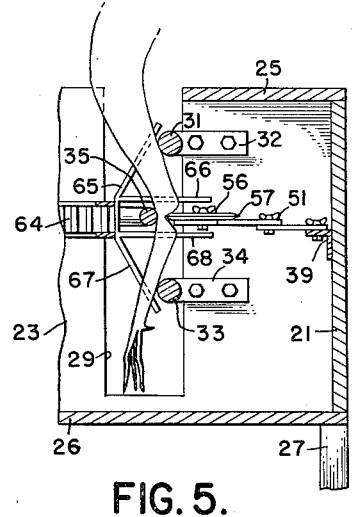
Figure 12:
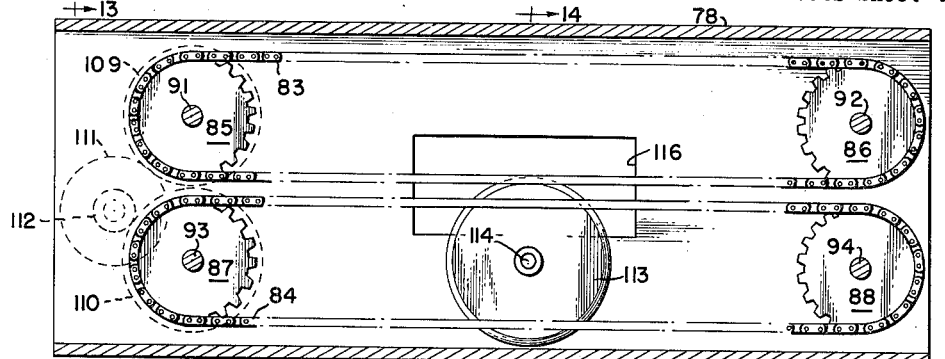
Figure 13:
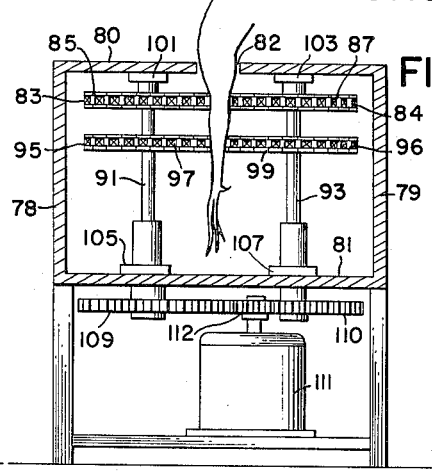
Figure 14:
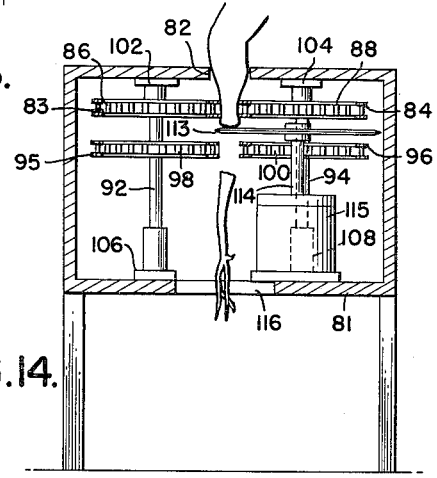
Figure 15:
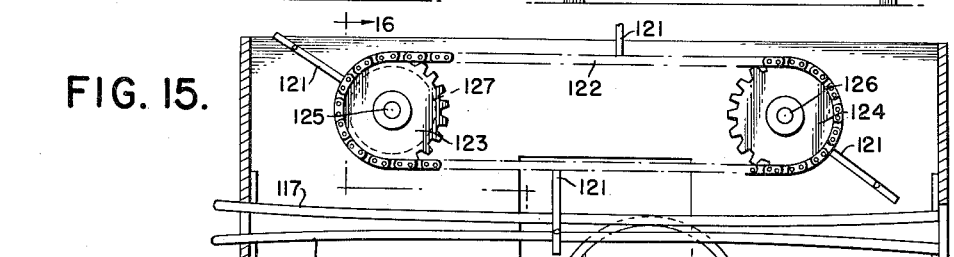
Figure 16:
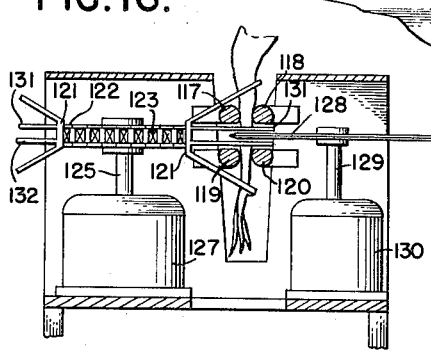

In the drawing:
FIG. 1 is a side elevational view of one embodiment of the invention in relation to a line of poultry carcasses moving on an overhead conveyor.
FIG. 2 is a plan section along the line 2—2 of FIG. 1, on a larger scale, apart from the carcasses.
FIGS. 3, 4, 5, 6, and 7 are cross-sectional views along the lines 3—3, 4—4, 5—5, 6—6, and 7—7, respectively, of FIG. 2 and showing the successive positions of a poultry leg passing through the machine.
FIG. 8 is a longitudinal sectional view along the line 8—8 of FIG. 2, on a reduced scale, without the cutters, cutter mounting bars and pushers.
FIG. 9 is an enlarged view of a portion of FIG. 2.
FIG. 10 is a section along the line 10—10 of FIG. 9.
FIG. 11 is a section along the line 11—11 of FIG. 9.
FIG. 12 is a plan sectional view, similar to FIG. 2, of a modified embodiment of the invention.
FIG. 13 is a cross-sectional view along the line 13—13 of FIG. 12 and showing the position of a poultry leg in the machine before the joint is severed.
FIG. 14 is cross-sectional view along the line 14—14 of FIG. 13 showing the position of a poultry leg as the joint is being severed at that point.
FIG. 15 is a view, similar to FIGS. 2 and 12, of a further modified embodiment of the invention.
FIG. 16 is a section along the line 16—16 of FIG. 15.

Referring with more particularity to the drawing in which like numerals designate like parts, the embodiment illustrated in FIGS. 1 to 11 comprises, generally, a rectangular housing having side walls 21 and 22, end walls 23 and 24, a top wall 25 and a bottom wall 26.

The housing is supported in any suitable manner, such as on floor legs 27.

The top wall has a longitudinal slot 28 extending from one end to the other and a vertical inlet slot 29 is provided in the end wall 23 contiguous with the slot 28. An outlet slot 30 is provided in the opposite end wall 24 contiguous with the slot 28.

Extending from the upper part of the inlet slot 29 to the upper end of the outlet slot 30 is upper bar 31 supported by suitable brackets at the end walls, such as bracket 32 on end wall 23. Directly beneath the bar 31 is a second or lower bar 33 parallel to the bar 31 and extending from a lower point in the slot 29 to a corresponding point in the slot 30. The bar 33 is supported on the end walls by suitable brackets, such as the bracket 34 in end wall 23.

About midway between the upper and lower bars 31 and 33, there is disposed a middle bar 35. This middle bar extends from one side of the bars 31 and 33 to the other side and intersects the vertical plane in which they lie at a point between the end walls 23 and 24, this forming an inlet V-shaped throat 36 on one side of the point of intersection (See FIG. 2).

The middle bar 35 is also tapered from the inlet end to the outlet end and is supported by end wall brackets 37 and 38.

Against the interior of the side wall 21, there is disposed a mounting bar 39 opposite the middle bar 35. Mounted on the bar 39 are a series of tools designed to act upon the joint to be severed. For the purpose of disjointing poultry limbs, a satisfactory arrangement of such tools has been found to comprise cutting and spreading tools in alternating relation.

A form of cutting tool comprises a T-shaped adjustable extension arm 40 mounted on the bracket 38 by a pivot bolt 41 and wing nut 42. It is resiliently biased against an abutment 43 on the side facing the inlet, by means of a coil spring 44 or any other suitable means.

The outer end of the arm 40 carries a cutting blade 45 having an arcuate cutting edge 46 tapering toward the inlet end of the housing. The blade 45 is made adjustable on the bar 40 relative to the bar 35 by means of transverse slots 47 and 48 in the blade and bolts 49 with wing nuts 50.

A form of joint spreader comprises a T-shaped adjustable extension arm 51, similar to the arm 40 and similarly mounted on the mounting bar 39 by means of a pivot bolt 52 and wing nut 53, and similarly biased by a spring 54 against an abutment 55. The outer end of the arm 51 carries a circular disc 56 having a tapered edge 57. The disc is mounted on the arm 51 by means of a bolt 58 and wing nut 59.

As many additional cutting and spreading devices can be provided as may be necessary alternately to cut connective tissue and cartilage between the joint bones a little at a time and spread the bones correspondingly, a little at a time, until the two sections of the limb are held together only by the skin at the back of the joint. This skin, as a final operation, is cut by a guillotine type blade 60 mounted on the middle bar 35.

To subject the limbs to the action of the cutters and spreader, the carcasses are hung on holders or racks 61 of an overhead conveyor 62 parallel to the slot 28. (See FIG. 1.) The carcasses are oriented and positioned such that they enter the throat 36 with the back of the limb joints adjacent the middle bar 35. The limbs are pushed through the device by means of mechanical pushers 63 mounted on a horizontal endless sprocket chain 64. The pushers 63 each comprise upper fingers 65 and 66 which contact the upper section of the carcass limbs and lower fingers 67 and 68 which contact the lower section of the carcass limbs.

The chain 64 is mounted on horizontal end sprocket wheels 69 and 70 at the upper end of vertical shafts 71 and 72, respectively. The shafts are supported in pole bearings 73 and 74, respectively, on the bottom wall 26 of the housing. An electric motor 75 is mounted on the bottom wall and drives the shaft 71.

By these means, the carcass limbs enter the throat 36 and, as they proceed to the opposite end of the housing, the joint is progressively flexed by virtue of the angularity between the bar 35 and the bars 31 and 33. The tapering of the bar 35 prevents excessive offsetting of the joint therefrom while it is subjected to this gradual flexing action.

As the flexing proceeds, the blades 45 and spreaders 56 alternately cut incremental portions of the cartilage and connective tissue between the adjacent bones of the joints, and spread the bones apart until the back skin between the joint is all that remains unsevered, as explained above, and which is then severed by the guillotine blade 60 to complete the operation. The severed lower limb section then falls down through a discharge opening 76 in the bottom wall 26 and the remaining part of the carcass is carried through by the conveyor line 62.

The discharged portions may be caught on a belt conveyor 77 or otherwise collected and carried to a processing or disposal point (not shown).

The modified form of the invention illustrated in FIGS. 12, 13 and 14 comprises a similar housing having side walls 78 and 79, a bottom wall 80 and a top wall 81. A slot 82 is provided in the top wall for the passage of the limbs.

Two pairs of endless sprocket chains are disposed within the housing to straddle the space below the slot 82. The upper chains 83 and 84 are supported on sprocket wheels 85, 86 and 87, 88, respectively. Vertical shafts 91, 92 and 93, 94 support the sprocket wheels with the adjacent reaches of the chains 83 and 84 spaced apart in an amount to engage the upper section of the limbs above the joint to be severed, and carry them along the slot 82.

The lower pair of chains 95 and 96 are supported on sprocket wheels 97, 98 and 99, 100, respectively. These sprocket wheels are mounted on the same shafts as the wheels 85, 86 and 87, 88, for rotation therewith, the inner reaches of these chains being spaced to contact the lower sections of the limbs below the joints to be severed.

The sprocket wheel shafts are each mounted in a pair of suitable bearings, one on the top wall 80 and one on the bottom wall 81, such as the top wall bearings 101, 102, 103 and 104 and corresponding bottom wall bearings 105, 106, 107 and 108, respectively.

Sprocket shafts 91 and 93 extend downwardly below the bottom wall 81 and are connected to gears 109 and 110, respectively, which gears are meshed with each other. These gears are driven by an electric motor 111 through a pinion gear 112 on the take-off shaft of the motor meshing with one of the other gears. However, any other suitable driving means may be used.

Between the upper and lower pairs of sprocket chains there is rotatably mounted a horizontal circular cutting blade 113 on a vertical shaft 114 driven by an electric motor 115 mounted on the bottom wall 81. Accordingly, as the carcass limbs are moved forward, the joint engages the blade 113 whereby the lower section of the limb is severed from the upper section and falls through a discharge outlet 116.

The embodiment of FIGS. 15 and 16 is similar in different respects to both of the previous embodiments illustrated. Instead of the sprockets and chains of the embodiment of FIGS. 12 to 14, a group of four longitudinal bars 117, 118, 119 and 120 are provided and pushers 121 on an endless chain 122 are similar to the pushers and chain of the embodiment of FIGS. 1 to 11.

The chain 122 is mounted on a pair of horizontal sprocket wheels 123 and 124 on shafts 125 and 126, respectively, one of which is the take-off shaft of an electric motor 127.

The bars 117, 118, 119 and 120 are slightly bowed at the middle to provide positive holding pressure against the limbs of the carcasses when severence is effected by a cutting disc 128, similar to that in the embodiment of FIGS. 12 to 14. The disc 128 is supported and driven by the take-off shaft 129 of a motor 130. The various parts are so proportioned that the inner fingers 131 and 132 of the pushers 121 move between the cutting disc 128 and the upper bars 117, 118 on the one hand, and the said disc and the lower bars 119, 120, on the other, respectively, as shown in FIG. 16.

Having thus described my invention, I claim:

1. A disjointer for carcass limbs comprising members forming a housing having a top wall, said wall having a longitudinal slot for slidably receiving carcass limbs to be disjointed, upper and lower longitudinal bars supported by the housing below and parallel to the slot, a longitudinal middle bar supported by the housing between and intersecting the plane of the said upper and lower bars to form an entrance throat for the limbs at one end of the slot, said middle bar being adapted to engage the back of the joint, the upper and lower bars being adapted to engage the front sides of the limb sections above and below the joint, means carried by the housing for forcing the limbs through the housing from one end of the slot to the other, whereby contact with said bars forces the joints to be progressively flexed, means supported by the housing for incrementally cutting cartilage and connective tissue between the sections and means supported by the housing for incrementally spreading the section of the joint in alternating relation to said cutting, as the limbs proceed through the housing and become progressively flexed.

2. A limb disjointer as defined by claim 1, in which the means for cutting the joints comprises resiliently yieldable blades adjacent the middle bar.

References Cited in the file of this patent

UNITED STATES PATENTS

| | | |
|---|---|---|
| 390,034 | Peckover | Sept. 25, 1888 |
| 2,306,773 | Biffinger | Dec. 29, 1942 |
| 2,468,595 | Elmendorf | Apr. 26, 1949 |
| 2,846,718 | Sengelaub et al. | Aug. 12, 1958 |
| 2,855,624 | Jerome et al. | Oct. 14, 1958 |